(12) United States Patent
Ryon et al.

(10) Patent No.: US 11,073,282 B2
(45) Date of Patent: Jul. 27, 2021

(54) GAS TURBINE COMBUSTION LINER COMPRISING HEAT TRANSFER CELL HEAT PIPES

(71) Applicant: Delavan Inc., West Des Moines, IA (US)

(72) Inventors: Jason A. Ryon, Carlisle, IA (US); Lev A. Prociw, Johnston, IA (US)

(73) Assignee: Delavan Inc., West Des Moines, IA (US)

( * ) Notice: Subject to any disclaimer, the term of this patent is extended or adjusted under 35 U.S.C. 154(b) by 359 days.

(21) Appl. No.: 15/686,944

(22) Filed: Aug. 25, 2017

(65) Prior Publication Data

US 2019/0063751 A1 Feb. 28, 2019

(51) Int. Cl.
  *F23R 3/00* (2006.01)
  *F28D 15/04* (2006.01)
  (Continued)

(52) U.S. Cl.
  CPC ............ *F23R 3/002* (2013.01); *F01D 25/145* (2013.01); *F23R 3/005* (2013.01); *F23R 3/50* (2013.01); *F28D 15/0266* (2013.01); *F28D 15/0275* (2013.01); *F28D 15/0283* (2013.01); *F28D 15/04* (2013.01); *F28D 15/046* (2013.01);
  (Continued)

(58) Field of Classification Search
  CPC .......... F23R 3/002; F23R 3/005; F28D 15/02; F28D 15/04; F28D 15/0233; F28D 15/283; F28D 15/046; F28D 15/0275
  See application file for complete search history.

(56) References Cited

U.S. PATENT DOCUMENTS 3,287,906 A * 11/1966 McCormick ............ F01D 5/181
60/39.511
3,493,177 A 2/1970 Bromberg et al.
(Continued)

FOREIGN PATENT DOCUMENTS

EP 3260780 A1 12/2017
EP 3351750 A2 7/2018
(Continued)

OTHER PUBLICATIONS

Calvin Silverstein, Preliminary Evaluation of Gas Turbine Regenerators Employing Heat Pipes, Apr. 1968, US Army Materiel Labatroies (Year: 1968).*
(Continued)

*Primary Examiner* — Scott J Walthour
*Assistant Examiner* — Todd N Jordan
(74) *Attorney, Agent, or Firm* — Locke Lord LLP; Scott D. Wofsy; Georgi Korobanov

(57) ABSTRACT

A heat transfer arrangement includes two or more heat transfer cells. The heat transfer cells together define a boundary between a higher temperature region and a lower temperature region. Each of the two or more heat transfer cells includes two or more walls defining a fluid tight cavity. One or more wick is fused to an inner surface of one or more of the walls to wick liquid from a lower temperature portion of the cavity to a higher temperature portion of the cavity. Combustors having heat transfer arrangements with heat transfer cells and methods of making heat transfer arrangements are also described.

13 Claims, 6 Drawing Sheets

(51) Int. Cl.
  *F28D 15/02* (2006.01)
  *F23R 3/50* (2006.01)
  *F01D 25/14* (2006.01)
  *F28D 21/00* (2006.01)

(52) U.S. Cl.
  CPC ...... *F05D 2230/22* (2013.01); *F05D 2240/35* (2013.01); *F05D 2260/208* (2013.01); *F23R 2900/00018* (2013.01); *F28D 2021/0026* (2013.01)

(56) References Cited

U.S. PATENT DOCUMENTS

| | | | |
|---|---|---|---|
| 3,719,046 A | | 3/1973 | Sutherland et al. |
| 3,735,806 A | * | 5/1973 | Kirkpatrick ............... E04B 1/80 165/272 |
| 7,644,753 B2 | * | 1/2010 | Ghosh ................. F28D 15/0233 165/104.26 |
| 2011/0214841 A1 | | 9/2011 | Huang et al. |
| 2018/0016985 A1 | * | 1/2018 | Ekanayake ......... F28D 15/0233 |

FOREIGN PATENT DOCUMENTS

| | | |
|---|---|---|
| GB | 2476253 A | 6/2011 |
| WO | WO-2016160023 A1 * | 10/2016  ......... F28D 15/0233 |

OTHER PUBLICATIONS

Silverstein, Calvin C., Heat Pipe Combustor Cooling (ASME Paper).
Extended European Search Report, of the European Patent Office, dated Jan. 24, 2019, issued in corresponding European Patent Application No. 18189056.7.

\* cited by examiner

GAS TURBINE COMBUSTION LINER COMPRISING HEAT TRANSFER CELL HEAT PIPES

BACKGROUND OF THE INVENTION

1. Field of the Invention

The present disclosure relates heat transfer, and more particularly to heat transfer arrangements having heat transfer cells and methods of making heat transfer arrangements.

2. Description of Related Art

Heat transfer systems commonly include heat sinks to remove heat from structures requiring cooling, such as structures in gas turbine engine hot sections. The heat sink generally receives heat from the structure and transfers the heat into the ambient environment. When the heat sink is directly connected to the structure the heat moves directly to the heat sink from the structure via conduction. When the heat sink is indirectly connected an intermediate structure is typically required, such as a coolant loop or heat pipe, to remove heat from the structure.

Heat pipes are passive devices which, in contrast to most cooling loops, do not require pumps or similar devices to convey coolant through the coolant loop. Instead, in heat pipe cooling systems, a liquid coolant is conveyed through a media contained within the heat pipe to a high temperature zone, where the coolant acquires heat and vaporizes. The vaporized coolant then flows along the heat pipe in the opposite direction to a heat sink, where the coolant transfers the heat into the heat sink and condenses into a liquid. The liquid thereafter returns to the high temperature zone through the heat pipe for a subsequent heat removal cycle.

Such conventional methods and systems have generally been considered satisfactory for their intended purpose. However, there is still a need in the art for improved heat transfer arrangements, heat transfer arrangements for gas turbine engine combustors, and methods of making heat transfer arrangements. The present disclosure provides a solution for this need.

SUMMARY OF THE INVENTION

A heat transfer arrangement includes a plurality of heat transfer cells. The plurality of heat transfer cells together defines a boundary between a higher temperature region and a lower temperature region. Each of the plurality of heat transfer cells includes two or more walls defining a fluid-tight cavity. One or more wick is fused to an inner surface of one or more of the walls to wick liquid from a lower temperature portion of the cavity to a higher temperature portion of the cavity.

In certain embodiments, the plurality of walls can include a hot side wall. The wick can extend over the hot side wall of the heat transfer cell. The plurality of walls can include a cold side wall. The walls can include a sintered-dense material. The wick can include a sintered-porous material. The plurality of walls and the wick have a common material composition. The heat transfer cell can have a polygonal shape. A liquid metal heat transfer fluid can be sealably confined within the fluid-tight cavity.

In accordance with certain embodiments, the plurality of walls can include at least one side wall. The wick can be a first wick and a second wick can be fused to the side wall opposite the first wick. The side wall can be a first side wall and the heat transfer cell can include a second side wall. The wick can be fused to both the first wall segment and the second wall segment. The plurality of walls can include a hot side wall and a cold side wall. The hot side wall can be parallel to the cold side wall. The cold side wall can have a span, the hot side wall can have a span, and at least one side wall with a height. The height of the side wall can be smaller than the span of the cold side wall and the span of the hot side wall.

It is contemplated that, in accordance with certain embodiments, at least one of the walls has an aperture. The heat transfer arrangement can include a plug. The plug can be sealably fixed within the aperture. The plug can be fixed-place welded, frictionally welded, or crimped to seal the fluid-tight interior of the heat transfer cell from the external environment. The aperture can be a first aperture. The plug can be a first plug and the wall having the first aperture can have a second. A second plug can be sealably fixed within the second aperture. The plurality of walls can include a cold side wall. The aperture can be defined in the cold side wall.

A combustor for a gas turbine engine includes a liner with a heat transfer arrangement as described above. The higher temperature portion of the cavities bound an interior of the combustor.

In certain embodiments the hot side wall can bound the interior of the combustor. The combustor can include a combustor dome and a fuel injector. A fuel injector can be seated in the liner. The fuel injector can separate a first of the heat transfer cells from a second of the heat transfer cells. The cold side walls of the heat transfer cells can bound the coolant channel. The outlet of the coolant channel can be downstream of the combustor. In accordance with certain embodiments the liner can include a honeycomb body. The walls of the heat transfer cells can define cells of the honeycomb body.

A method of making a heat transfer arrangement includes densely sintering a powdered material to form a plurality of walls that define a fluid tight cavity of a heat transfer cell and porously sintering the powdered material to form a wick fused to at least one of the plurality of walls.

In certain embodiments the method can include fusing the wick to at least one of the plurality of walls. The method can include removing powdered material from the fluid-tight cavity. The method can include introducing a heat transfer fluid into the fluid-tight cavity. The method can include sealing the fluid-tight cavity from the environment external of the thermal management cell.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
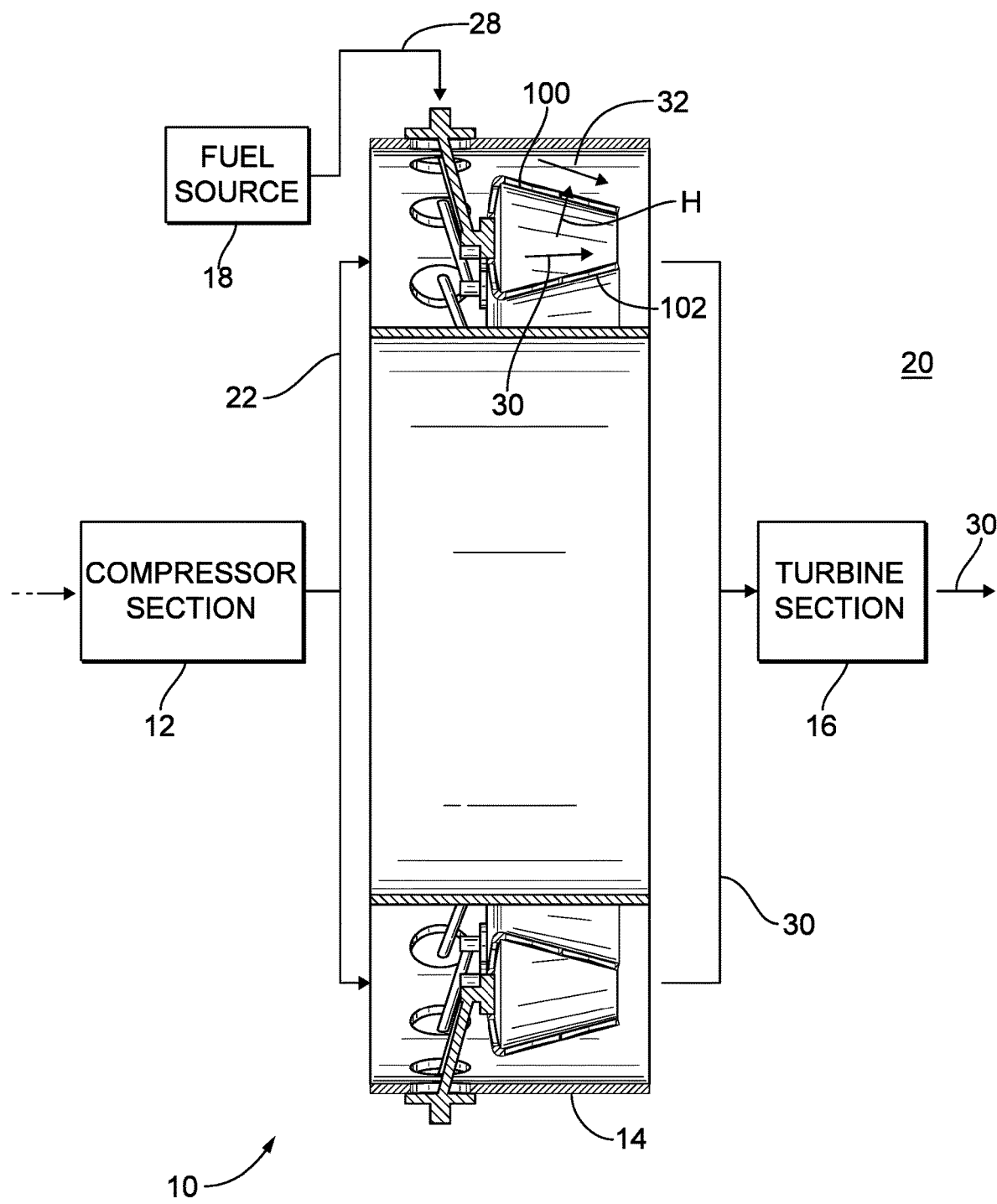
FIG. 1 is a cross-sectional view of an exemplary embodiment of a gas turbine engine constructed in accordance with the present disclosure, schematically showing a combustor section with a combustor and a heat transfer arrangement.

Reference will now be made to the drawings wherein like reference numerals identify similar structural features or aspects of the subject disclosure. For purposes of explanation and illustration, and not limitation, a partial view of an exemplary embodiment of a heat transfer arrangement in accordance with the disclosure is shown in FIG. 1 and is designated generally by reference character 100. Other embodiments of heat transfer arrangements and methods of making heat transfer cells for heat transfer arrangements in accordance with the disclosure, or aspects thereof, are provided in FIGS. 2-5, as will be described. The systems and methods described herein can be used for thermal management, such as in gas turbine engine combustors, though the present disclosure is not limited gas turbine engine combustors or to gas turbine engines in general.

Referring to FIG. 1 gas turbine engine 10 is shown. Gas turbine engine 10 includes a compressor section 12, a combustor section 14, and a turbine section 16. Compressor section 12 is in fluid communication with combustor section 14. Combustor section 14 is in fluid communication with turbine section 16 and a fuel source 18. Turbine section 16 is in fluid communication with the ambient environment 20 and is operatively connected to compressor section 12 to provide mechanical power to compressor section 12.

During operation, compressor section 12 receives mechanical power for rotation from turbine section 16 to compress fluid ingested from the ambient environment, thereby generating compressed fluid 22 for communication to combustor section 14. Combustor section 14 provides compressed fluid 22 to a combustor 102, where fuel 28 from fuel source 18 is introduced and oxidized to generate high temperature combustion products 30. Combustor 102 provides high temperature combustion products 30 to turbine section 16, which expands the high temperature combustion products 30, extracts work for providing mechanical power to compressor section 12, and discharges the expanded combustion products 30 to ambient environment 20.

As will be appreciated by those of skill in the art in view of the present disclosure, the temperature of combustor 102 can be relatively high compared to temperatures at which materials forming elements of combustor 102 begin to change. It is therefore necessary to transfer heat between engine structures, e.g., cool combustor 102. Heat transfer arrangement 100 is therefore provided to remove heat H from combustor 102 by transferring heat H from combustor 102. In the illustrated exemplary embodiment heat H is transferred to a coolant fluid 32 traversing the exterior of combustor 102, and is thereafter communicated to external environment 20. Communication can be accomplished, for example, by flowing heated coolant fluid 32 through combustor 102 and/or through turbine section 16, or via any other suitable routing, as appropriate for a given application.

Figure 2:
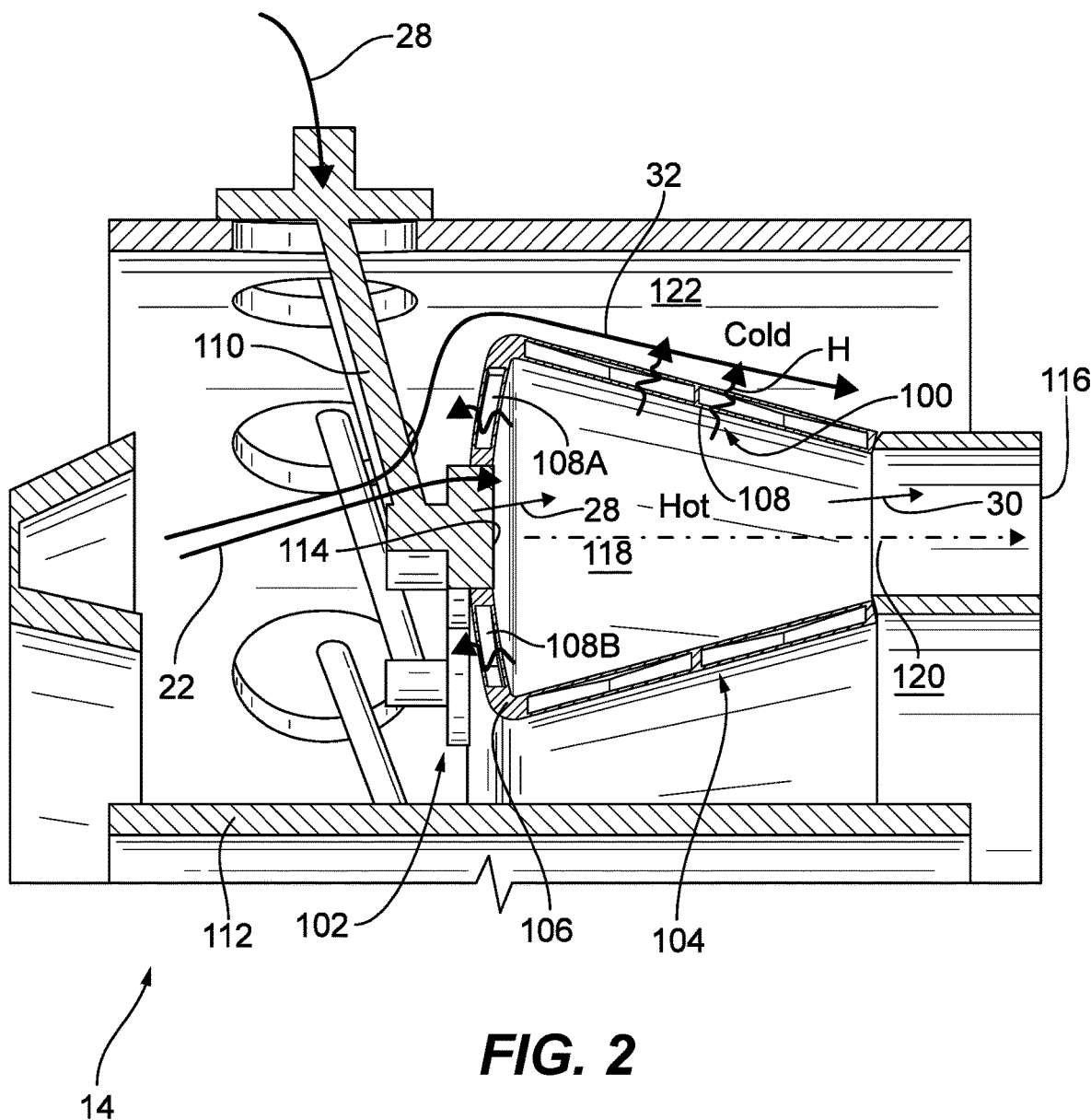
FIG. 2 is a cross-sectional view of heat transfer arrangement of FIG. 1, schematically showing a combustor with a fuel injector and a combustor liner including the heat transfer cells.

With reference to FIG. 2, a portion of combustor section 14 including combustor 102 is shown. Combustor 102 includes heat transfer arrangement 100 with two or more heat transfer cells 108. Heat transfer cells 108 together define a boundary 104, e.g., a combustor liner 104, between a higher temperature region 118, e.g., an interior 118 of combustor 102, and a lower temperature region 122, e.g., a coolant channel 122.

Figure 4:
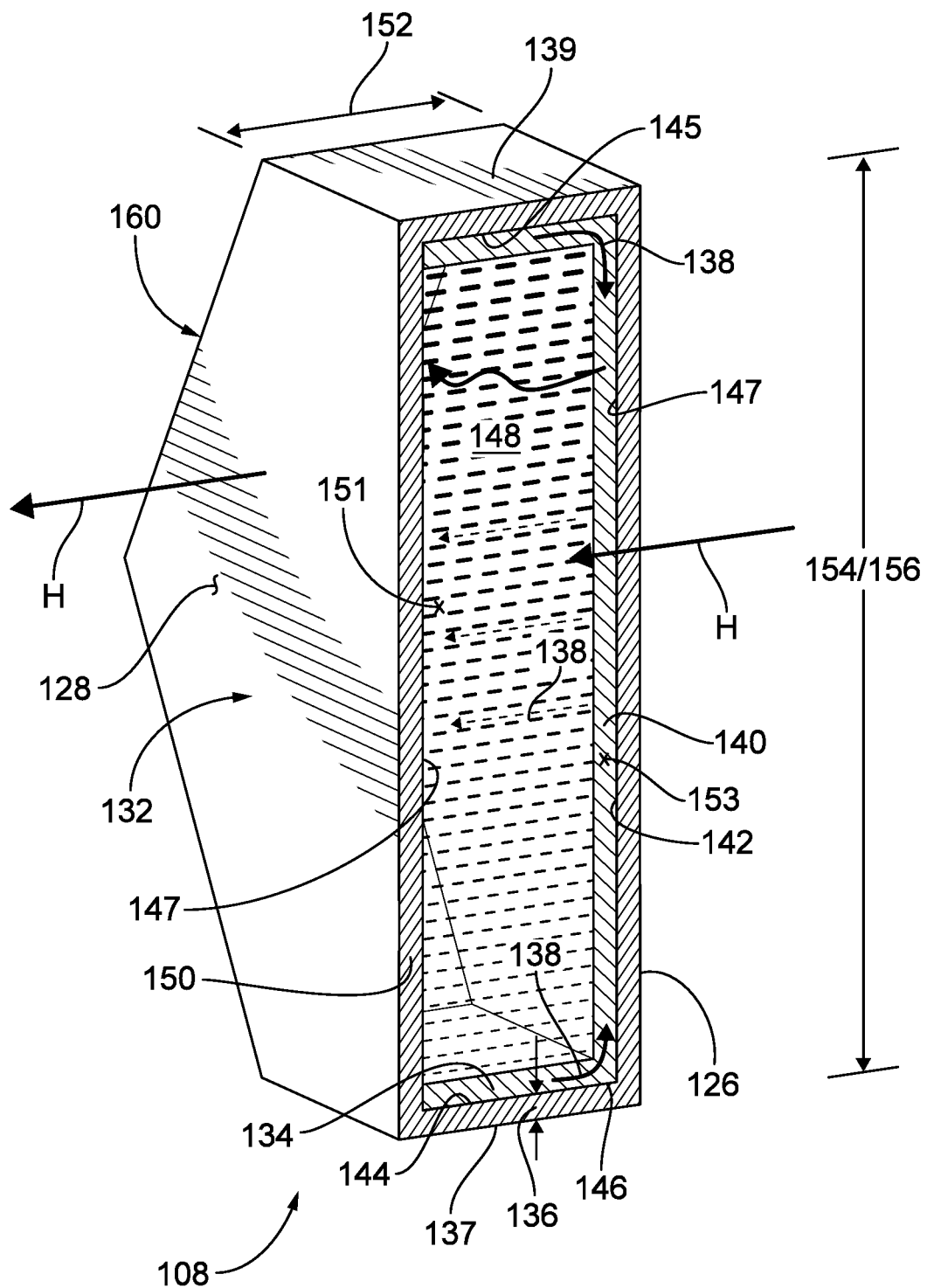
FIG. 4 is perspective view of a portion of the combustor of FIG. 1, schematically showing a heat transfer cell forming a portion of the combustor liner.

Referring to FIG. 4, an exemplary heat transfer cell 108 is shown. Each of the two or more heat transfer cells 108 has two or more walls, i.e., a hot side wall 126 and a cold side wall 128, defining a fluid tight cavity 148. One or more wick 134 is fused to an inner surface, e.g., hot side interior surface 142 of one or more of the walls. Wick 134 is configured to wick liquid, e.g., heat transfer fluid 138, from a lower temperature portion 151 of fluid-tight cavity 148 to a higher temperature portion 153 of fluid-tight cavity 148.

Referring again to FIG. 2, combustor 102 includes liner 104, a combustor dome 106, the plurality of heat transfer cells 108, a fuel injector 110, and a case 112. Liner 104 also has an inlet 114 and an outlet 116 in fluid communication with one another through interior 118. Inlet 114 is in fluid communication with outlet 116 along a flow axis 120, which extends through combustor interior 118. Case 112 extends about combustor liner 104 and defines therebetween coolant plenum 122, which is disposed between case 112 and liner 104 for receiving heat H. Liner 104 forms a boundary between a higher temperature region, e.g., combustor interior 118, and a lower temperature region, e.g., coolant plenum 122, within a device, e.g., combustor section 14.

Fuel injector 110 is seated in liner 104, e.g., within inlet 114, and is in fluid communication with fuel source 18 (shown in FIG. 1) to receive therefrom fuel 28. Fuel injector 110 is also in fluid communication with compressor section 12 (shown in FIG. 1) and receives therefrom compressed fluid 22. Compressed fluid 22 and fuel 28 generate high temperature combustion products 30 within combustor interior 118, generating heat H and flowing through combustor interior 118 to combustor outlet 116, and therethrough to turbine section 16 (shown in FIG. 1). Heat H flows through the plurality of heat transfer cells 108 via heat transfer arrangement 100 from combustor interior 118 to coolant plenum 122. Coolant plenum 122 is in fluid communication with a coolant source, e.g., compressor section 12, and receives therefrom a coolant fluid 32. Coolant fluid 32 flows across the exterior of liner 104, receives heat H through heat transfer arrangement 100, and carries heat H to external environment 20 (shown in FIG. 1).

It is contemplated that each of heat transfer cells 108 can be arranged at certain locations within liner 104 such that hot side walls 126 (shown in FIG. 4) bound combustor interior 118 and cold side walls 128 (shown in FIG. 4) bound coolant plenum 122 outside of combustor 102. In the illustrated exemplary embodiment a first heat transfer cell 108A is separated from a second heat transfer cell 108B by fuel injector 110, facilitating cooling of combustor dome 106. In accordance with certain embodiments substantially the entirely of liner 104 is formed by heat transfer cells 108, for example by heat transfer cells 108 with having polygonal shapes, reducing the tendency of hots spots to develop at discrete locations within combustor 102.

Figure 3A:
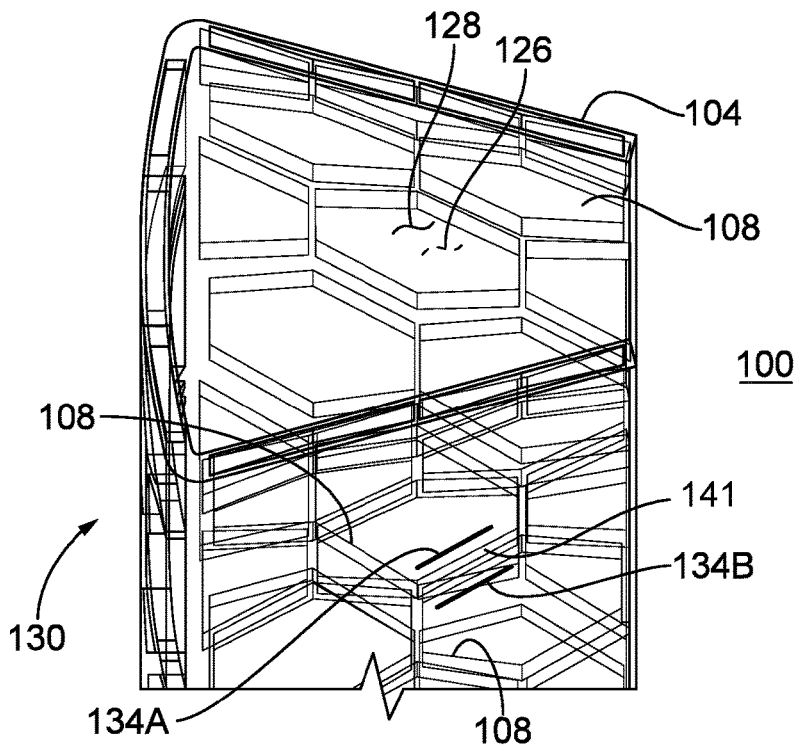
FIGS. 3A-3C are perspective views of portions of the combustor of FIG. 1, schematically showing a honeycomb body with heat transfer cells forming the combustor liner.
Figure 3B:
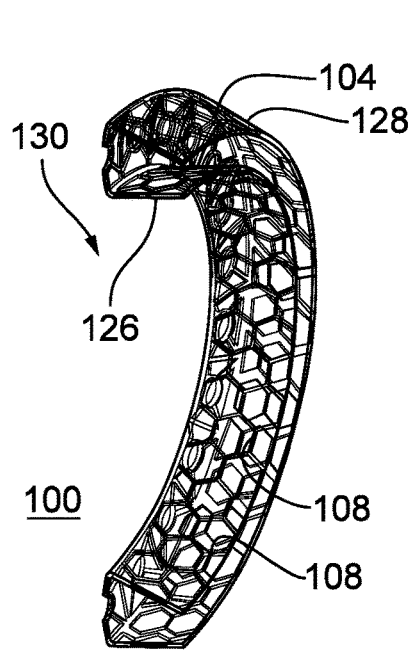
Figure 3C:
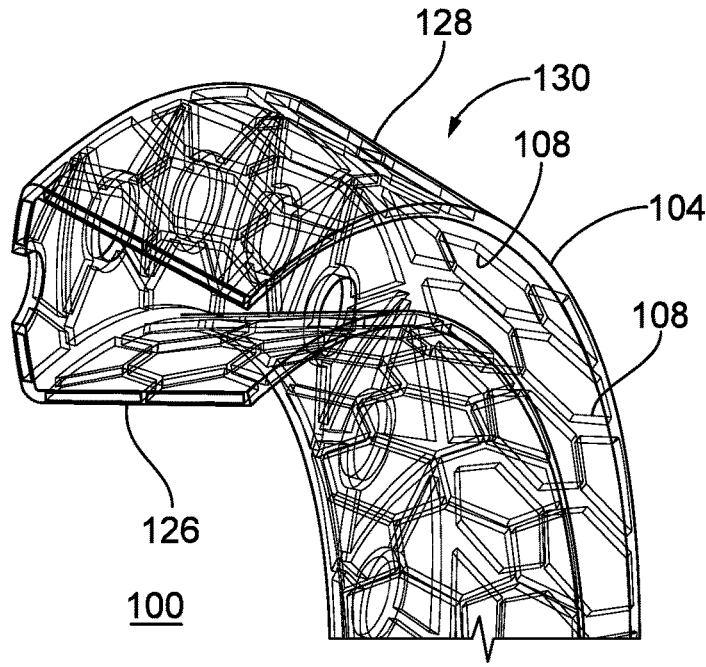

Referring to FIGS. 3A-3C, an exemplary heat transfer arrangement 100 of liner 104 is shown. Heat transfer arrangement 100 includes the plurality of heat transfer cells 108. Heat transfer cells 108 are heat pipes with flow areas having widths, defined on respective hot sides and colds sides, that are dimensionally larger than lengths defined between the hot and cold sides. In this respect heat transfer cells 108 form a portion of liner 104, have a hot side wall 126 and an opposite cold side wall 128, and are arranged in different orientations relative to flow axis 120 (shown in FIG. 2). It is contemplated that the cold side wall 128 of a given heat transfer cell can be parallel, oblique, or orthogonal relative to flow axis 120. It is also contemplated that the plurality of heat transfer cells 108 can form a honeycomb body 130 (shown in FIGS. 3A-3C). Honeycomb body 130 can in turn form substantially the entirely of liner 104 or only a portion of combustor 102 (shown in FIG. 2), each heat transfer cell hot side wall 126 bounding combustor interior 118 (shown in FIG. 2), each heat transfer cell cold side wall 128 bounding coolant plenum 122 (shown in FIG. 2). Honeycomb body 130 can form only a portion of liner 104, for example at locations otherwise prone to localized heating, such as at combustor dome 106 (shown in FIG. 2) for example.

With reference to FIG. 4, an exemplary heat transfer cell 108 is shown. Heat transfer arrangement 100 (shown in FIG. 1) includes one or more heat transfer cells 108 with an envelope 132 and a wick 134. Envelope 132 has a side wall 136 that connects hot side wall 126 of heat transfer cell 108 with cold side wall 128 of heat transfer cell 108. Wick 134 is arranged within envelope 132, is fused to side wall 136, and extends between hot side wall 126 and cold side wall 128 of heat transfer cell 108 to convey heat transfer fluid 138 in a liquid state within envelope 132 between lower temperature portion 151 of fluid-tight cavity 148 and higher temperature portion 153 of heat transfer cell 108.

Envelope 132 encloses an interior 148 sealably containing heat transfer fluid 138 and is formed from a sintered-dense material 150. Wick 134 is formed from a sintered-porous material 140. As used herein the term sintered-dense refers to structures formed by application of energy to a powdered material sufficient to render the structure fluid-tight structure, e.g., impermeable to heat transfer fluid 138 in a liquid and/or vapor state. As used herein the term sintered-porous refers to structures formed by application of energy to the powdered material sufficient to render the structure porous, the resulting structure conveying fluid, e.g., heat transfer fluid 138 in a liquid state, therethrough via capillary action. It is contemplated that sintered-porous material 140 and sintered-dense material 150 can include a common material, such as a common metallic material. For a common material, formation of sintered-dense material 150 generally requires a greater amount of energy than formation of sintered-porous material 140.

Side wall 136 can include a plurality of wall segments, e.g., a first wall segment 137 and a second wall segment 139, connected to one another at adjacent lateral edges. First wall segment 137 and second wall segment 139 are each connected to hot side 126 and cold side 128 on longitudinally opposite ends. In the illustrated exemplary embodiment envelope 132 has a polygonal shape 160, which is hexagonal. As will be appreciated by of skill in the art in view of the present disclosure, the polygonal shape reduces the distance heat transfer fluid 138 in a liquid state need travel to travel along hot side wall 126, which limits the effect that gravity has on liquid movement, and in turn allowing pores of relatively coarse size to be utilized. Those of skill in the art will appreciate that other shapes are possible in view of the present disclosure, e.g., geometrically irregular shapes, as suited for the geometry of combustor liner 104 (shown in FIG. 2).

Side wall 136 has a height 152 defined between hot side wall 126 and cold side wall 128. Height 152 is smaller than a span 154 of hot side wall 126. It is contemplated that height 152 be smaller than a span 156 of cold side wall 128. It is also contemplated that height 152 can be smaller than a width of side wall 136 defined between opposed lateral edges of side wall 136. Hot side wall 126 is substantially parallel to cold side wall 128. Although illustrated in FIG. 4 as planar in FIG. 4, it is to be understood and appreciated that hot side wall 126 and cold side wall 128 can be arcuate, as suitable for the specific integration of heat transfer cell 108 into combustor 102 (shown in FIG. 1).

The sintered-porous material 140 of wick 134 extends over at least a portion of an interior surface 142 of hot side wall 126. As shown in FIG. 4, wick 134 extends over substantially the entirety interior surface 142 of hot side wall 126. Wick 134 also extends over at least a portion of an interior surface 144 of first wall segment 137. Wick 134 further extends over at least a portion of an interior surface 145 of second wall segment 139. It is contemplated that wick 134 can extend over substantially the entirety of interior surface 142 of hot side wall 126, interior surface 144 of first wall segment 137, and interior surface 145 of second wall segment 139. An interior surface 147 of cold side wall 128 is at least exposed to fluid-tight cavity 148, wick 134 not being disposed over interior surface 147 such that heat transfer fluid 138 in a vapor state can condense thereon. Attachment of wick to interior surface 142 and interior surface 144 is via an interfusing layer, e.g., interfusing layer 146, which can be formed by sintering or by application of laser energy in a powder be fusing apparatus in an amount between that necessary to form sintered-dense material 150 and that necessary to form sintered-porous material 140 for a given material.

Heat transfer fluid 138 is sealably contained within fluid-tight interior 148 for communicating heat H from hot side wall 126 to cold side wall 128. It is contemplated that heat transfer fluid 138 can include a material that maintains a liquid state at room temperature. For example, heat transfer fluid 138 can include water, alcohol or glycol. It is also contemplated that hat transfer fluid 138 can include a material that maintains a solid state at room temperature. For example, heat transfer fluid 138 can include a so-called 'liquid metal', such as sodium or lithium by way of non-limiting example.

During operation of combustor 102 (shown in FIG. 1), heat H generated within combustor 102 transfers from hot side wall 126 to heat transfer fluid 138. Heat H causes heat transfer fluid 138 to change state, e.g., become molten and/or assume a vapor state, upon introduction of a predetermined amount of heat. Once heated heat transfer fluid 138 traverses side wall height 152 and comes into contact with cold side wall 128. Contact with cold side wall 128 causes heat transfer fluid 138 to cool, condensing from a vapor state (shown with dashed arrows) to a liquid state (shown with solid line) as heat H flows from heat transfer fluid 138 through cold side 128 and into coolant plenum 122 (shown in FIG. 2). Once condensed, wick 134 wicks liquid state heat transfer fluid 138 across interior surface 144 and interior surface 145 to hot side wall 126, and distributes heat transfer fluid 138 over interior surface 147 of hot side wall 126 via capillary action through pores defined within sintered-porous material 140, thereby additional transfer of heat from hot side wall 126 to cold side wall 128.

With continuing reference to FIG. 3A, cooperation of wicks in adjacent heat transfer cells, e.g., a first wick 134A and a second wick 134B, is shown. Heat transfer cells 108 containing first wick 134A and second wick 134B share a common wall 141. First wick 134A is fused within one of the heat transfer cells 108 on side of common wall 141 opposite second wick 134B. Second wick 134B is fused within the other of the heat transfer cells 108 opposite first wick 134A. As will be appreciated by those of skill in the art in view of the present disclosure, first wick 134A and second wick 134B provide fluidly independent paths for fluid communication between hot side 126 and cold side 128. As will also be appreciated by those of skill in the art in view of the present disclosure, being independent, the amount of coolant included in one of the hat transfer cells can be different than the other, thereby providing the ability to tune the rate of heat transfer through a given heat transfer cell according to expected heating at a given combustor location.

Figure 5A:
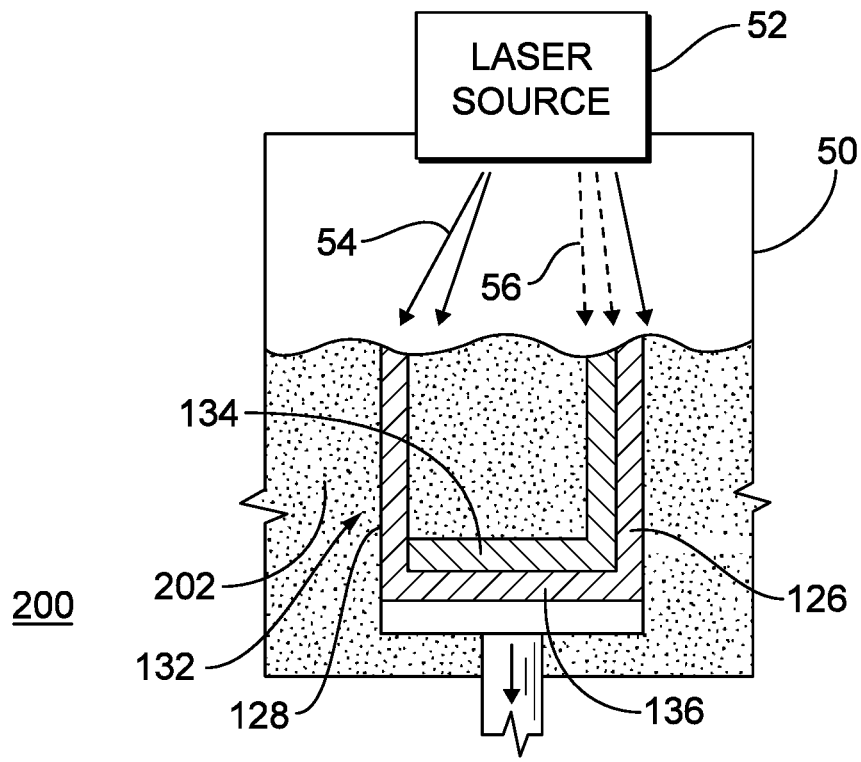
FIGS. 5A-5E are schematic views of a method of making a heat transfer arrangement, schematically showing a heat transfer cell with a sintered-dense envelope and a sintered-porous wick being formed using an additive manufacturing technique.

With reference to FIGS. 5A-5E, a method 200 of making a heat transfer cell, e.g., heat transfer cell 108 (shown in FIG. 2), for a heat transfer arrangement, e.g., heat transfer arrangement 100 (shown in FIG. 1), is shown. As shown in FIG. 5A, envelope 132 is formed by densely sintering a powdered material 202 to form a plurality of walls that define a fluid tight cavity of a heat transfer cell. In this respect powdered material 202 is densely sintered to form hot side wall 126, cold side wall 128, and side walls 136 formed of sintered-dense material 150 (shown in FIG. 4). It is contemplated that powdered material 202 be sintered in a powder bed fusion apparatus 50 using a laser source 52 configured for applying energy 54 sufficient to fully fuse powered material. Powdered material 202 can include a steel alloy, such as nickel-based steel alloy, by way of non-limiting example.

Method 200 also includes porously sintering powdered material 202 to form wick 134 fused to at least one of the plurality of wall, e.g., side wall 136 and hot side wall 126. It is contemplated that wick 134 be formed by porously sintering or semi-sintering powdered material 202 to form a sintered-porous material 140 (shown in FIG. 4). Wick 134 can be fused to side wall 136 and/or hot side wall 126 using energy 56, which is contemplated to be lower in intensity than that of energy 54, for conveying heat transfer fluid in a liquid state within the interior of heat transfer cell 108 between cold side wall 128 and hot side wall 126, as described above. Fusing can be accomplished, for example, by attenuating the output of laser source 52 according to the spatial location of the beam in powdered material 202, energy 56 porously sintering (or semi-sintering) powdered material 202 in locations where the wick is to be formed (arranged), and coincidently densely sintering (or fully sintering) powdered material 202 in locations where the envelope is to be formed (arranged).

Figure 5B:
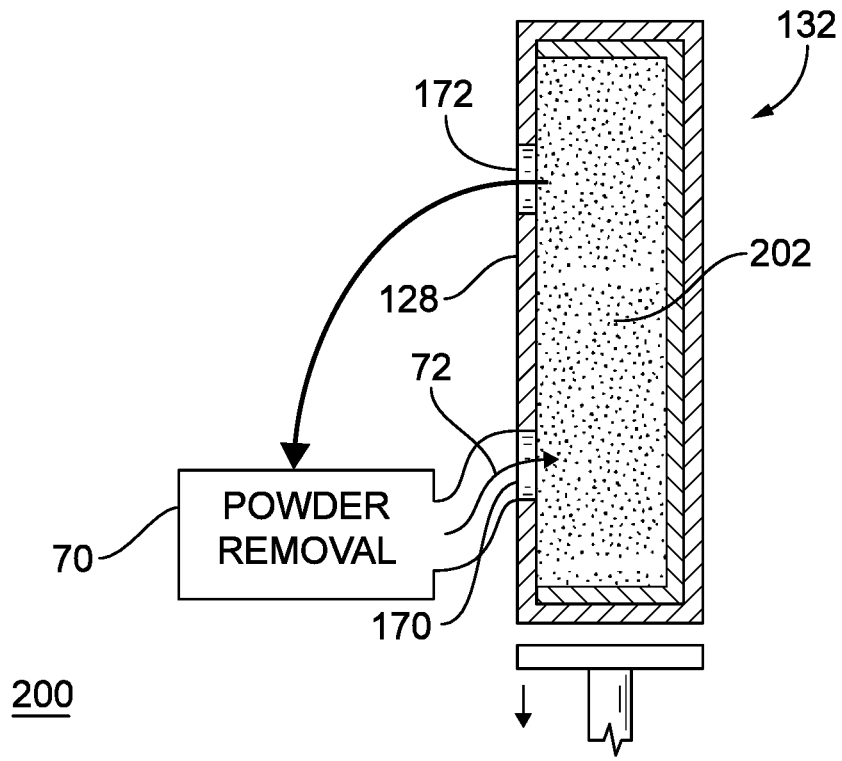

Referring to FIG. 5B, residual powdered material 202 is thereafter removed from envelope 132. Removal can be accomplished using either (or both) of first aperture 170 and a second aperture 172. For example, a powder removal apparatus 70 can coupled to one of first aperture 170 and second aperture 172 defined through cold side wall 128. Residual powdered material 202 can thereafter be drawn through the aperture via negative pressure. Alternatively, positive pressure 72 can be applied to the other of first aperture 170 and second aperture 172 and residual powdered material 202 ejected from fluid-tight cavity 148 by the positive pressure. The heat transfer cell is 108 can thereafter (or previously) be removed from a build plate of powder bed fusion apparatus 50.

Figure 5C:
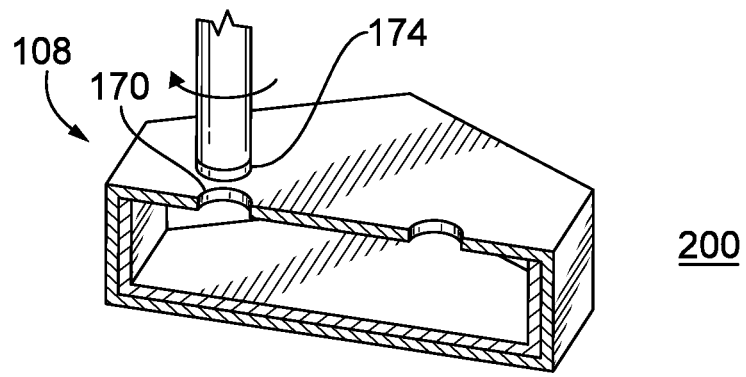

As shown in FIG. 5C, first aperture 170 is sealed with a first plug 174. First plug 174 can be seated within first aperture 170 in a crimping operation, e.g., by crimping a tube used to provide the motive gas for removal of residual powdered material 202, or by welding first plug 174 in first aperture 170. The welding can be accomplished by friction welding, for example, by seating first plug 174 in first aperture 170 while rotating first plug 174 relative to heat transfer cell 108.

Figure 5D:
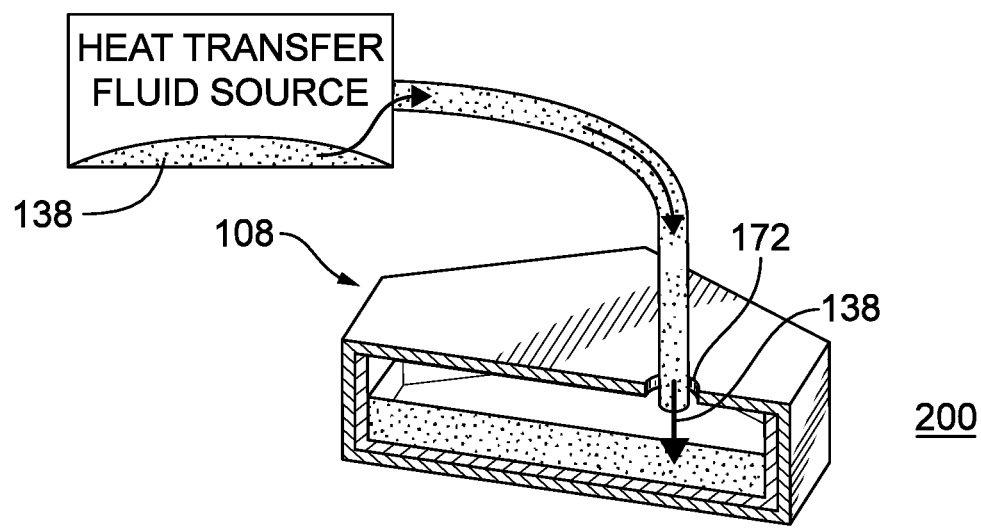

Referring to FIG. 5D, heat transfer fluid 138 is thereafter introduced into the heat transfer cell 108. Heat transfer fluid 138 can be introduced through second aperture 172 from a fluid source, either under ambient pressure conditions or under vacuum. As will be appreciated by those of skill in the art in view of the present disclosure, liquid metals such as liquid sodium and liquid lithium can be introduced as powders during charging, the metal powder becoming a liquid once heat H (shown in FIG. 2) is present in an amount sufficient to render the melt the metal.

Figure 5E:
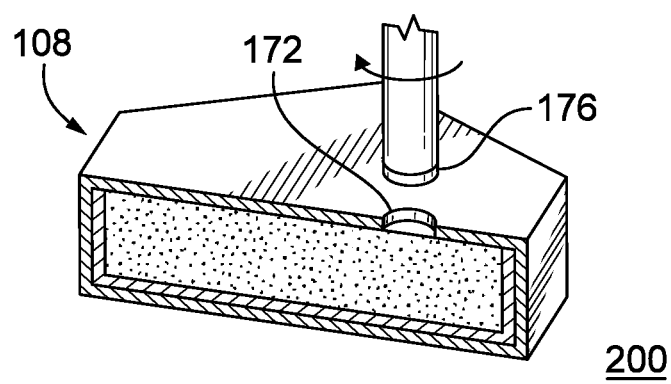

As shown in FIG. 5E, second aperture 172 of heat transfer cell 108 is thereafter sealed with a second plug 176. Second plug 176 can similarly be seated within second aperture 172 in a crimping operation, e.g., by crimping a tube used to provide heat transfer fluid 138 to the interior of the heat transfer cell envelope, or by welding second plug 176 in second aperture 172. The welding can be accomplished by friction welding, for example, by seating second plug 176 in second aperture 172 while rotating second plug 176.

The methods and systems of the present disclosure, as described above and shown in the drawings, provide for heat transfer arrangements with superior properties including combustor liners with tolerance for high heat loads. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A gas turbine comprising:
   a combustor, the combustor comprising a liner;
   the liner comprising:
      a plurality of heat transfer cells together defining a boundary between a higher temperature region and a lower temperature region of the combustor, each of the heat transfer cells comprising:
         a plurality of walls defining a fluid tight cavity, wherein each fluid tight cavity comprises:
            a hot wall of the plurality of walls, the hot wall having a maximum span in a first direction;
            a cold wall of the plurality of walls;
            a plurality of side walls of the plurality of walls, the plurality of side walls having a maximum height in a second direction, wherein the second direction is perpendicular to the first direction;
            wherein the plurality of side walls extend from the hot wall to the cold wall;
            wherein the maximum span of the hot wall is greater than the maximum height of the plurality of side walls; and
         at least one wick fused to an inner surface of the hot wall, the at least one wick configured to wick a liquid from a lower temperature portion of the fluid tight cavity to a higher temperature portion of the fluid tight cavity, wherein at least a portion of an inner surface of the cold wall is not in contact with the at least one wick; and wherein each heat transfer cell has a polygonal shape; and wherein the hot wall of each of the plurality of heat transfer cells bounds an interior of the combustor.

2. The gas turbine as recited in claim 1, wherein for each fluid tight cavity the plurality of walls comprise a sintered-dense material, and wherein the at least one wick comprises a sintered-porous material.

3. The gas turbine as recited in claim 1, wherein for each fluid tight cavity the plurality of walls and the at least one wick have a common material composition.

4. The gas turbine as recited in claim 1, wherein for each fluid tight cavity at least one wall of the plurality of walls has an aperture, wherein a plug is sealably fixed within the aperture.

5. The gas turbine as recited in claim 4, wherein for each fluid tight cavity the plug is fixed-place welded, frictionally welded, or crimped to seal the fluid tight cavity.

6. The gas turbine as recited in claim 4, wherein for each fluid tight cavity the aperture is a first aperture, the plug is a first plug, and wherein the wall having the first aperture has a second aperture, wherein a second plug is sealably fixed within the second aperture.

7. The gas turbine as recited in claim 4, wherein for each fluid tight cavity the first aperture is defined in the cold wall.

8. The gas turbine as recited in claim 1, wherein the liquid is a liquid metal heat transfer fluid.

9. The gas turbine as recited in claim 1, wherein for each fluid tight cavity the at least one wick is a first wick and each fluid tight cavity further comprising a second wick, wherein the second wick is fused to a first side wall of the plurality of side walls.

10. The gas turbine as recited in claim 9, each fluid tight cavity further comprising a second side wall of the plurality of side walls, wherein the second wick is fused to both the first side wall and the second side wall.

11. The gas turbine as recited in claim 1, wherein for each fluid tight cavity the hot wall is parallel to the cold wall.

12. The gas turbine as recited in claim 1, wherein the combustor comprises a combustor dome and a fuel injector, wherein the fuel injector is seated within the liner and separates a first of the plurality of heat transfer cells from a second of the plurality of heat transfer cells.

13. The gas turbine as recited in claim 1, wherein the hot wall is hexagonal and the cold wall is hexagonal.

\* \* \* \* \*